(12) United States Patent
Mathur (10) Patent No.: US 8,489,515 B2
(45) Date of Patent: Jul. 16, 2013

(54) SOCIAL NETWORK BASED RECOMMENDATION METHOD AND SYSTEM

(75) Inventor: Arpit Mathur, Philadelphia, PA (US)

(73) Assignee: Comcast Interactive Media, LLC., Philadelphia, PA (US)

( * ) Notice: Subject to any disclaimer, the term of this patent is extended or adjusted under 35 U.S.C. 154(b) by 212 days.

(21) Appl. No.: 12/437,682

(22) Filed: May 8, 2009

(65) Prior Publication Data

US 2010/0287033 A1  Nov. 11, 2010

(51) Int. Cl.
 *G06Q 99/00* (2006.01)
(52) U.S. Cl.
 USPC .......................................................... 705/319
(58) Field of Classification Search
 USPC .......................................................... 705/319
 See application file for complete search history.

(56) References Cited

U.S. PATENT DOCUMENTS

| | | | | |
|---|---|---|---|---|
| 2002/0045154 | A1* | 4/2002 | Wood et al. | 434/350 |
| 2005/0071328 | A1* | 3/2005 | Lawrence | 707/3 |
| 2007/0214121 | A1 | 9/2007 | Ebanks | |
| 2007/0281607 | A1* | 12/2007 | Bucher et al. | 455/3.06 |
| 2008/0052371 | A1* | 2/2008 | Partovi et al. | 709/217 |
| 2008/0092182 | A1* | 4/2008 | Conant | 725/109 |
| 2008/0133495 | A1 | 6/2008 | Fischer | |
| 2008/0134053 | A1* | 6/2008 | Fischer | 715/747 |
| 2008/0257134 | A1* | 10/2008 | Oppenheimer | 84/609 |
| 2009/0197681 | A1* | 8/2009 | Krishnamoorthy et al. | 463/42 |
| 2009/0228918 | A1* | 9/2009 | Rolff et al. | 725/34 |
| 2009/0306996 | A1* | 12/2009 | Tsaparas et al. | 705/1 |

FOREIGN PATENT DOCUMENTS

WO  2006050278 A2  5/2006

OTHER PUBLICATIONS

Golbeck, Jennifer, and James Hendler. "Filmtrust: Movie recommendations using trust in web-based social networks." Proceedings of the IEEE Consumer communications and networking conference. vol. 96. University of Maryland, 2006.*

European Search Report for Application No. 10161356.0 mailed Oct. 1, 2010.

* cited by examiner

*Primary Examiner* — Jonathan Ouellette
*Assistant Examiner* — Maame Ofori-Awuah
(74) *Attorney, Agent, or Firm* — Banner & Witcoff, Ltd.

(57) ABSTRACT

Recommendations for content may be generated based on social networking communities. For example, a user may receive a list of recommended content items based on content that has been viewed by others in the user's social networks. Recommendations may further be based on content information such as reviews, ratings, tags, attributes and the like from various sources internal and external to the user's social networks. Content items may be given a weight that corresponds to a determined level of relevance or interest to a user. Using the weight, a list of recommended items may be sorted or filtered. In one or more configurations, the weight may be modified based on an age of the content item. For example, the relevance, importance or interest of a news report may decline as the news becomes older and older.

28 Claims, 9 Drawing Sheets

SOCIAL NETWORK BASED RECOMMENDATION METHOD AND SYSTEM

TECHNICAL FIELD

Aspects of the disclosure relate to providing content recommendations. More specifically, aspects of the disclosure are directed to providing content recommendations based on social networks.

BACKGROUND

With the amount of media available today, it can be difficult for a person to identify content items that are of interest, importance or relevance to him or her. Oftentimes, a person may spend significant amounts of time browsing through content items to manually identify a news article, movie, song or other content item that interests him or her. Further, the individual might only identify recommended or preferred items based on personal preferences and already-known information about the content items without the benefit of external influences such as the person's social networks.

BRIEF SUMMARY

The following presents a simplified summary of the disclosure in order to provide a basic understanding of some aspects. It is not intended to identify key or critical elements of the disclosure or to delineate the scope of the disclosure. The following summary merely presents some concepts of the disclosure in a simplified form as a prelude to the more detailed description provided below.

One or more aspects described herein relate to generating content item recommendations based on social network information. For example, content item recommendations for a user may be determined based on content items that members of the user's social networks have accessed, tagged, viewed, commented on or otherwise interacted with. Content item recommendations may further be determined from other content information sources such as internal and external content information databases (e.g., IMDB.COM), user preferences, advertisements and the like.

According to another aspect, content items may be ranked in a recommendations list based on the interactions and attributes of each item. Thus, comments about a content item stored in a social networking community may be used as a basis for increasing or decreasing the relevance, potential interest or importance of the content item. Similarly, attributes such as genre, title, description, actors/actresses and the like may be used as further considerations in ranking and weighting content items.

According to yet another aspect, content item weights may be modified over time. In one embodiment, a content item's weight may decay over time due to the age of the content item. This may represent a decrease in relevance, importance or interest as a content item becomes older. Decay rates may vary depending on the type of content item. For example, news articles may decay at a faster rate than blockbuster movies.

Other embodiments can be partially or wholly implemented on a computer-readable medium, for example, by storing computer-executable instructions or modules, or by utilizing computer-readable data structures.

The methods and systems of the above-referenced embodiments may also include other additional elements, steps, computer-executable instructions, or computer-readable data structures. In this regard, other embodiments are disclosed and claimed herein as well.

The details of these and other embodiments are set forth in the accompanying drawings and the description below. Other features and advantages will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
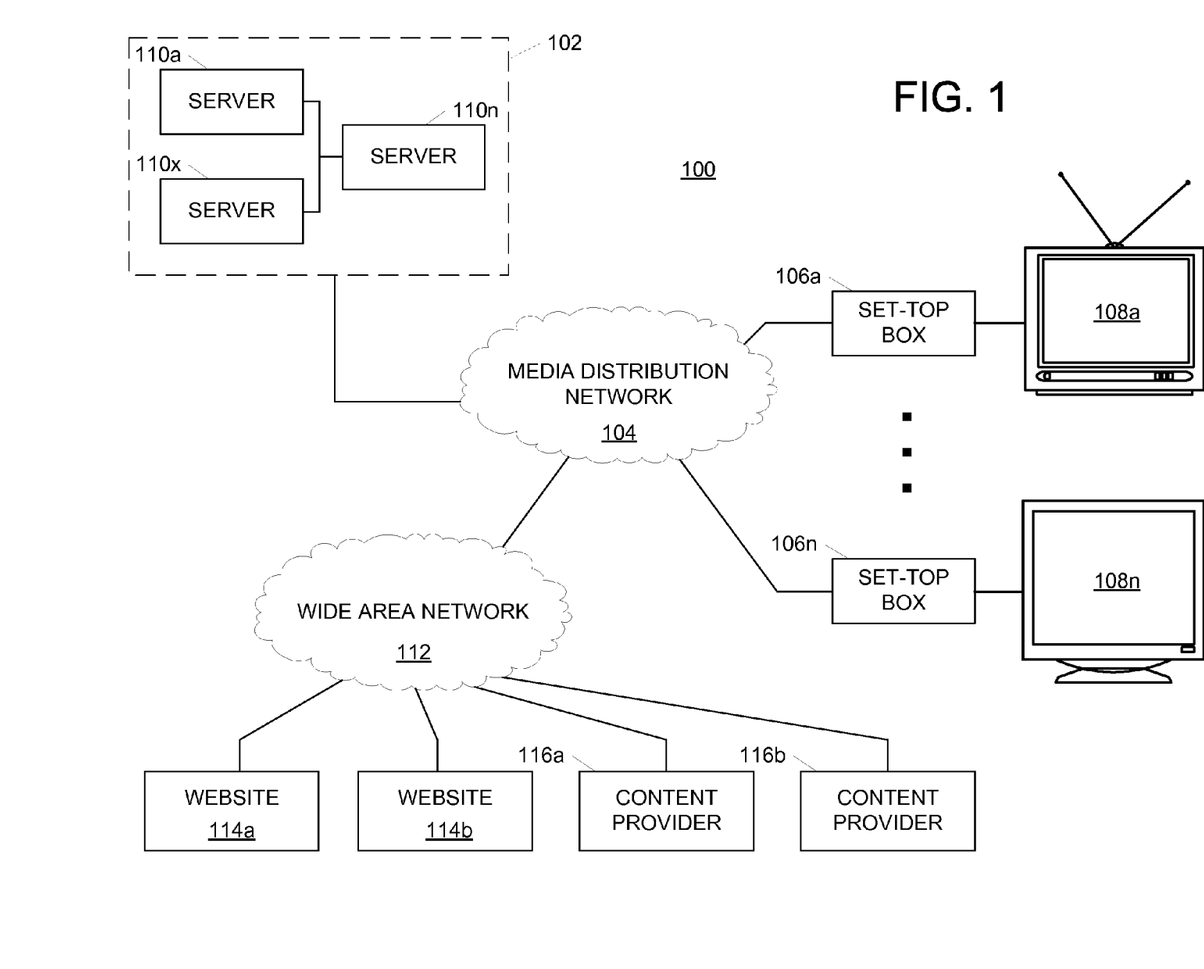
FIG. 1 illustrates an example network distribution system in which content items may be provided to subscribing clients.

FIG. 1 illustrates a content processing and distribution system 100. The distribution system 100 may include a headend 102, a network 104, set top boxes (STB) 106 and corresponding receiving and/or transmitting devices (i.e., receiver, transceiver, etc.) 108. The distribution system 100 may be used as a media service provider/subscriber system wherein the provider (or vendor) generally operates the headend 102 and the network 104 and also provides a subscriber (i.e., client, customer, service purchaser, user, etc.) with the STB 106.

The STB 106 is generally located at the subscriber location such as a subscriber's home, a tavern, a hotel room, a business, etc., and the receiving device 108 is generally provided by the subscribing client. The receiving device 108 may include a television, high definition television (HDTV), monitor, host viewing device, MP3 player, audio receiver, radio, communication device, personal computer, media player, digital video recorder, game playing device, cable modem, etc. The device 108 may be implemented as a transceiver having interactive capability in connection with the STB 106, the headend 102 or both the STB 106 and the headend 102.

The headend 102 is generally electrically coupled to the network 104, the network 104 is generally electrically coupled to the STB 106, and each STB 106 is generally electrically coupled to the respective device 108. The electrical coupling may be implemented as any appropriate hardwired (e.g., twisted pair, untwisted conductors, coaxial cable, fiber optic cable, hybrid fiber cable, etc.) or wireless (e.g., radio frequency, microwave, infrared, etc.) coupling and protocol (e.g., Home Plug, HomePNA, IEEE 802.11(a-b), Bluetooth, HomeRF, etc.) to meet the design criteria of a particular application. While the distribution system 100 is illustrated showing one STB 106 coupled to one respective receiving device 108, each STB 106 may be configured with having the capability of coupling more than one device 108.

The headend 102 may include a plurality of devices 110 (e.g., devices 110a-110n) such as data servers, computers, processors, security encryption and decryption apparatuses or systems, and the like configured to provide video and audio data (e.g., movies, music, television programming, games, and the like), processing equipment (e.g., provider operated subscriber account processing servers), television service transceivers (e.g., transceivers for standard broadcast television and radio, digital television, HDTV, audio, MP3, text messaging, gaming, etc.), and the like. At least one of the devices 110 (e.g., a sender security device 110x), may include a security system.

The network 104 is generally configured as a media stream distribution network (e.g., cable, satellite, and the like) that is configured to selectively distribute (i.e., transmit and receive) media service provider streams (e.g., standard broadcast television and radio, digital television, HDTV, VOD, audio, MP3, text messaging, games, etc.) for example, to the STBs 106 and to the receivers 108. The stream is generally distributed based upon (or in response to) subscriber information. For example, the level of service the client has purchased (e.g., basic service, premium movie channels, etc.), the type of service the client has requested (e.g., standard TV, HDTV, interactive messaging, etc.), and the like may determine the media streams that are sent to (and received from) a particular subscriber.

In one or more embodiments, network 104 may further provide access to a wide area network (WAN) 112 such as the Internet. Accordingly, STB 106 or headend 102 may have access to content and data on the wide area network. In one example, a service provider may allow a subscriber to access websites 114 and content providers 116 connected to the Internet (i.e., WAN 112) using the STB 106. Websites 114 may include news sites, social networking sites, personal webpages and the like. In another example, a service provider (e.g., a media provider) may supplement or customize media data sent to a subscriber's STB 106 using data from the WAN 112. As further described herein, content recommendations may be generated by a service provider (e.g., headend 102) using content information from a WAN such as the Internet.

Figure 2:
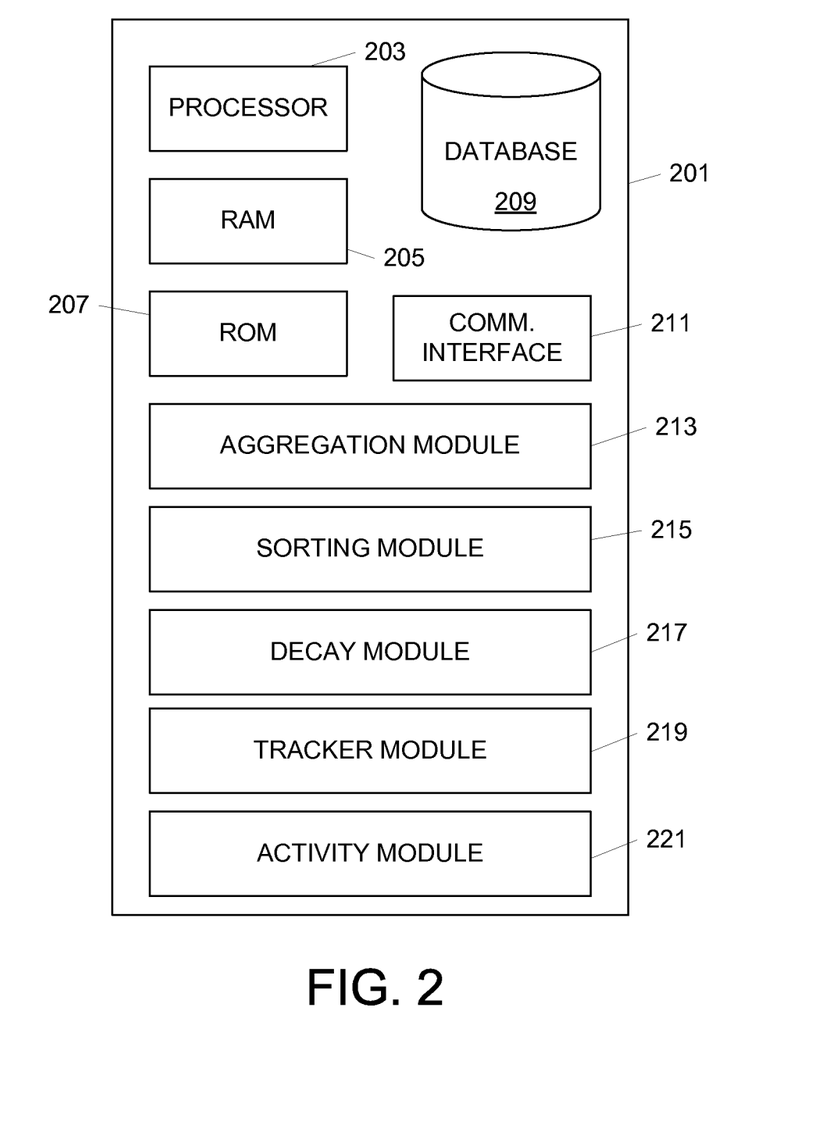
FIG. 2 illustrates an example block diagram of an apparatus for receiving content item data and generating content item recommendations according to one or more aspects described herein.

FIG. 2 illustrates a block diagram of a recommendation system 201 that may be used to process content item information and generate a list of recommended content items for a user. Content items, as used herein, refers generally to any type of media including visual, audio and print. For example, content items may include videos such as television shows, movies, interviews, news shows, audio including sound bits, music, books-on-tape and print such as news reports, articles, books, magazines, and the like. According to one or more embodiments, recommendation system 201 may include a processor 203 configured to execute instructions and carry out mathematical calculations, memory such as random access memory (RAM) 205, read only memory (ROM) 207 and database 209. Database 209 may be configured to store a variety of information such as application data, user preference information, content items, application programming and the like. Recommendation system 201 may further include a communication interface 211 configured to provide the recommendation system 201 with receiving and transmission capabilities. Recommendation system 201 may, for example, receive data about content items from other recommendation systems or rating engines such as IMDB.COM and ROTTENTOMATOES.COM. Alternatively or additionally, recommendation system 201 may receive content item data from other sources such as social networking communities where members may access and otherwise interact with content items. Recommendation system 201 may similarly transmit content item data and recommendations (e.g., to a subscriber) using communication interface 211.

Content may be gathered from diverse sources by an aggregation module 213 that may be configured to poll or be pinged by a variety of sources for content item data and generate an aggregated list of content items as described in further detail herein. Content relevance and importance may be calculated by activity module 221. For example, activity module may be configured to calculate a weight based on different actions on that content by members of the user's social networks as well as the global population. Sorting module 215, on the other hand, may be configured to sort the recommended content items based on a relevance or interest weight. Further, a decay module 217 may also operate in conjunction with aggregation module 213 and activity module 221 to modify the weights of content items based on the age of a content item. Sorting and decaying of content item relevance or interest are also described in further detail herein.

Recommendation system 201 may be, in one or more arrangements, a part of a service provider, e.g., as a portion of headend 102 (FIG. 1). Alternatively, recommendation system 201 may be separate from headend 102 and may be implemented in one or more computers associated or located within with set-top boxes. In yet another embodiment, recommendation system 201 may be a distributed module that includes operations both within headend 102 and external to headend 102. The components of recommendation system 201 may be configured as hardware, software, firmware and/or combinations thereof.

In one or more configurations, recommendation system 201 may further include a tracker module 219 that is configured to track user interactions with content when presented to a user and interpret those interactions as indicating interest or non-interest in various content items. Such interactions may be interpreted by tracker module 219 to collect further data that may be relevant to providing recommendations to other users who may be part of the user's social network. For example, tracker module 219 may detect a subscriber's interaction with a pay-per-view movie. Based on the interaction, the tracker module 219 may determine that the subscriber has a strong interest in the pay-per-view movie. Additionally or alternatively, tracker module 219 may determine that the subscriber is interested in a genre of movie with which the pay-per-view content is associated. Tracker module 219 may have the flexibility to interpret multiple types of interactions in a variety of ways.

Figure 3:
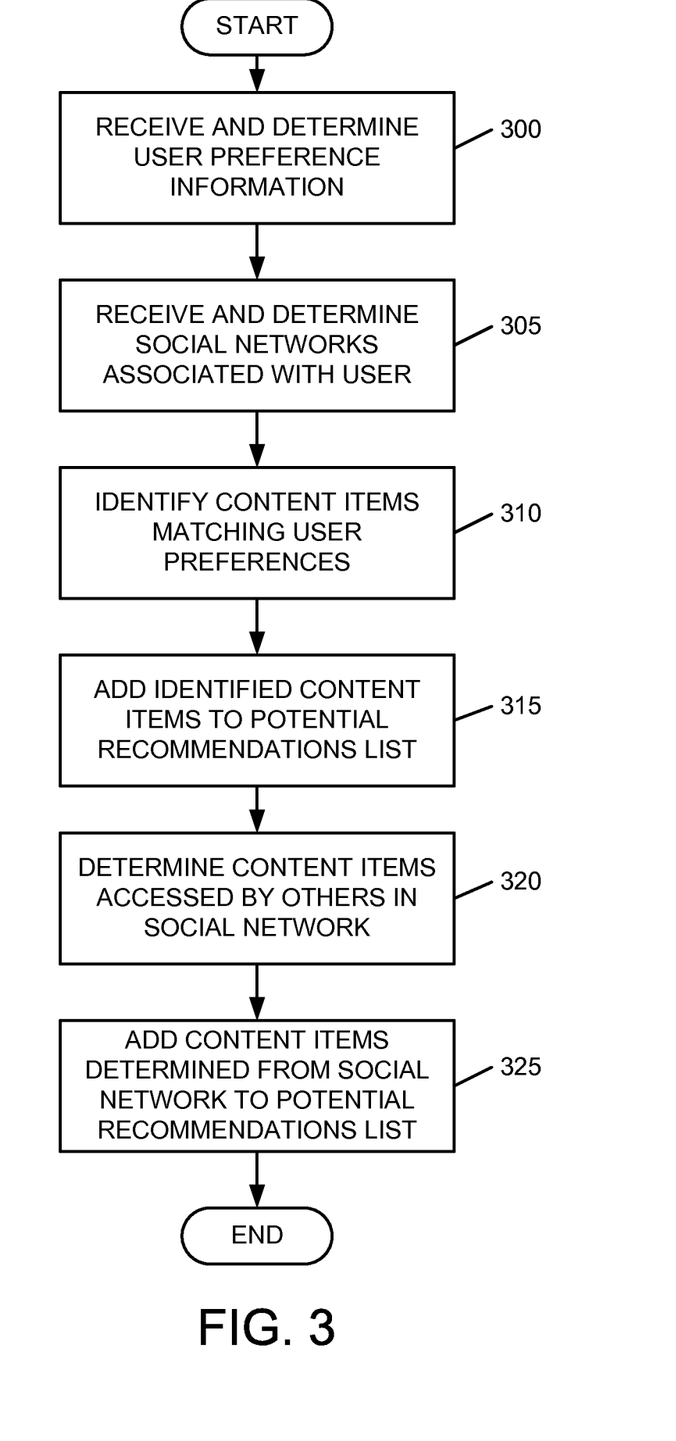
FIG. 3 illustrates an example method for generating content item recommendations based on social network information according to one or more aspects described herein.

FIG. 3 illustrates a method for making content recommendations for a user based on activity and information in the user's social network. In step 300, a recommendation system may receive or otherwise determine user preference information. User preference information may correspond to topics of interest, content genres (e.g., comedy, science fiction, action/adventure), time periods of interest (e.g., the 70s or 60s), preferred actors/actresses and the like. User preference information may be determined explicitly from user input or implicitly based on user interactions and behavior. In one example, user preference information may be received from a user in the form of keywords. In another example, user preference information may be determined based on tracking the actors or actresses the user most frequently watches. Users may further specify a strength of interest in a keyword, actor, genre and the like. Various other preference determination mechanisms may be used.

Figure 9:
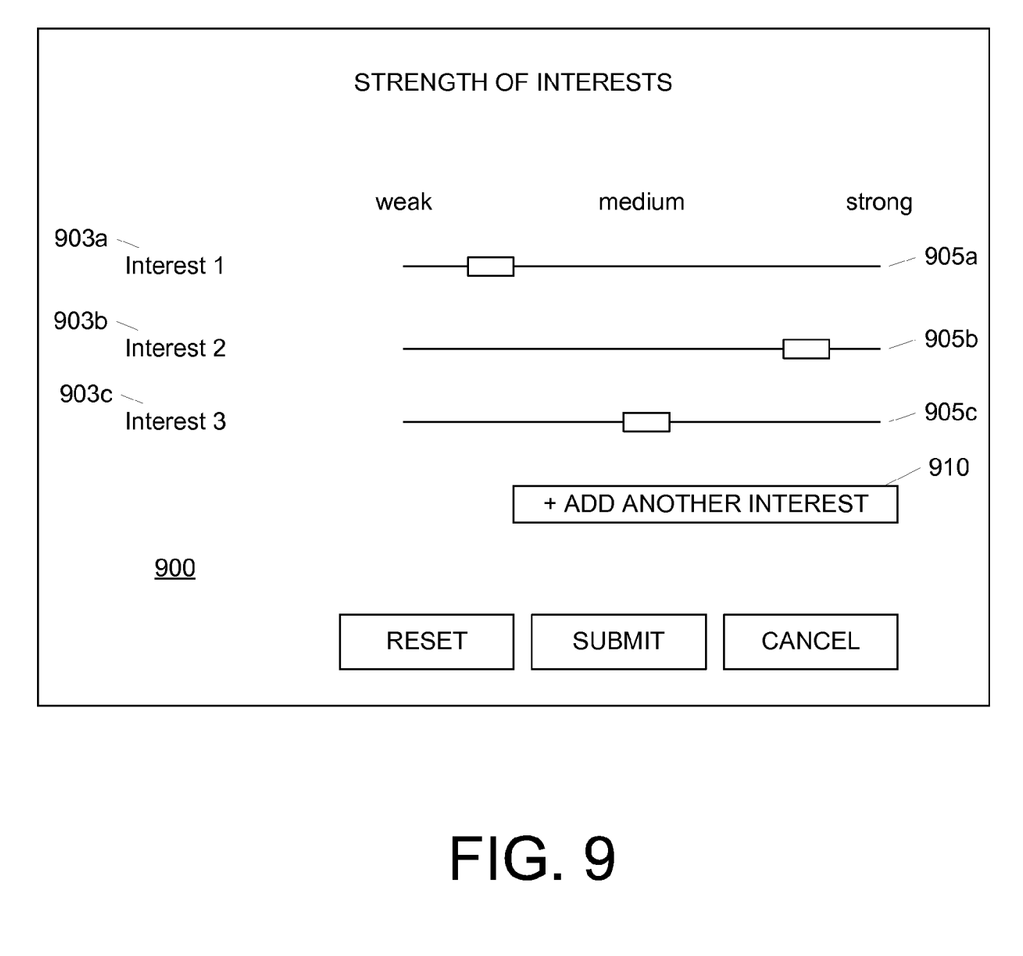
FIG. 9 illustrates an example interface for setting interest strength according to one or more aspects described herein.

In one or more configurations, the user may also be presented a visual aid to allow them to enter relative importance of their interests compared to each other. FIG. 9 illustrates an example user interface where a user may specify strengths of interest. Interface 900 includes a list of interests 903, each having a corresponding slider bar 905. Slider bar 905 may represent a range of interest strength, e.g., from weak interest to strong interest. Alternatively, the range of slider bar 905 may be represented by a numeric scale such as 1 to 10. Option 910 may also be provided in interface 900 to allow a user to add additional interests.

Referring again to FIG. 3, in step 305, a user's membership in one or more social network communities may be determined. For example, the recommendation system may request that a user identify the social network communities of which he or she is a part. Additionally, the recommendation system may request the user's authorization information so that the recommendation system may access the user's social network communities and retrieve content item information therefrom. In some configurations, a user's membership in social network communities may be identified through analyzing cookies stored by a network browser, a network browsing history, data stored on the user's computing device and/or combinations thereof. However, confirmation and authorization information (e.g., login and password) for accessing information in the social network community might still be requested.

In step 310, the system may identify one or more content items that match the determined user preferences from a content database. Furthermore content found on the user's extended network not in the database can be added to the database. For example, the system may perform a keyword search to identify matches in genre, actor/actress names, words in titles or descriptions of the content or words used in the content itself (e.g., words spoken or used) and the like. Content items may also be identified from the content database based on one or more other criteria including user demographics (e.g., age, gender, ethnicity), geographic location, overall content popularity and the like. In step 315, the identified content items may be added to a list of potential content recommendations.

In step 320, the system may build on a potential recommendations list by determining content items that have been viewed or otherwise accessed by members of the user's social networks in the social network community. The social network site may return information such as the names or identifiers of accessed content items, a number of times accessed, comments associated with the content item, a number of positive or negative votes received by the content item, an average user rating and the like. Accessing a content item may include rating the item, commenting on the content, tagging the content item, sending a link to the content item, sending the content item itself and the like. Social network sites may track and log content access and interaction of their users and make such information available to other applications or services with proper authorization. The recommendation system may such content access information through data access or retrieval protocols provided by the social networking site or community.

In one or more arrangements, a social networking site might only provide or otherwise make accessible the content access data for members of a user's social networks. A social network or group, as used herein, refers generally to a social structure of nodes (e.g., individuals or organizations) that are tied by one or more types of interdependency such as values, ideas, friendship, kinship and the like. Accordingly, the content access information of members of a social network may be valuable in generating recommendations for a user that is also a member of that social network. A social network community, on the other hand, generally refers to a service or system that facilitates the creation, maintenance and management of social networks. For example, FACEBOOK is a social network community that allows users to create social networks such as interest groups therein. In one example, a social network may comprise a group of the user's friends. In another example, a social network may comprise a group of users sharing a similar interest in travel. In one or more arrangements, a social network site may also indicate the particular social network from which a particular piece of content access information is derived (e.g., FACEBOOK may indicate that a Iron Man trailer was viewed 25 times by members of a Marvel Comics social network).

Alternatively or additionally, accessing of content items by members of a social network may be tracked by the recommendation system for those individuals that also use or subscribe to the recommendation system. Accordingly, the recommendation system may search within its own databases to obtain content access data of such individuals in a user's social network. In step 325, the content items identified through the social network communities may be added to the list of potential content recommendations. Optionally, in one or more configurations, the list of potential content recommendations may be presented to the user as recommended content items.

Figure 4:
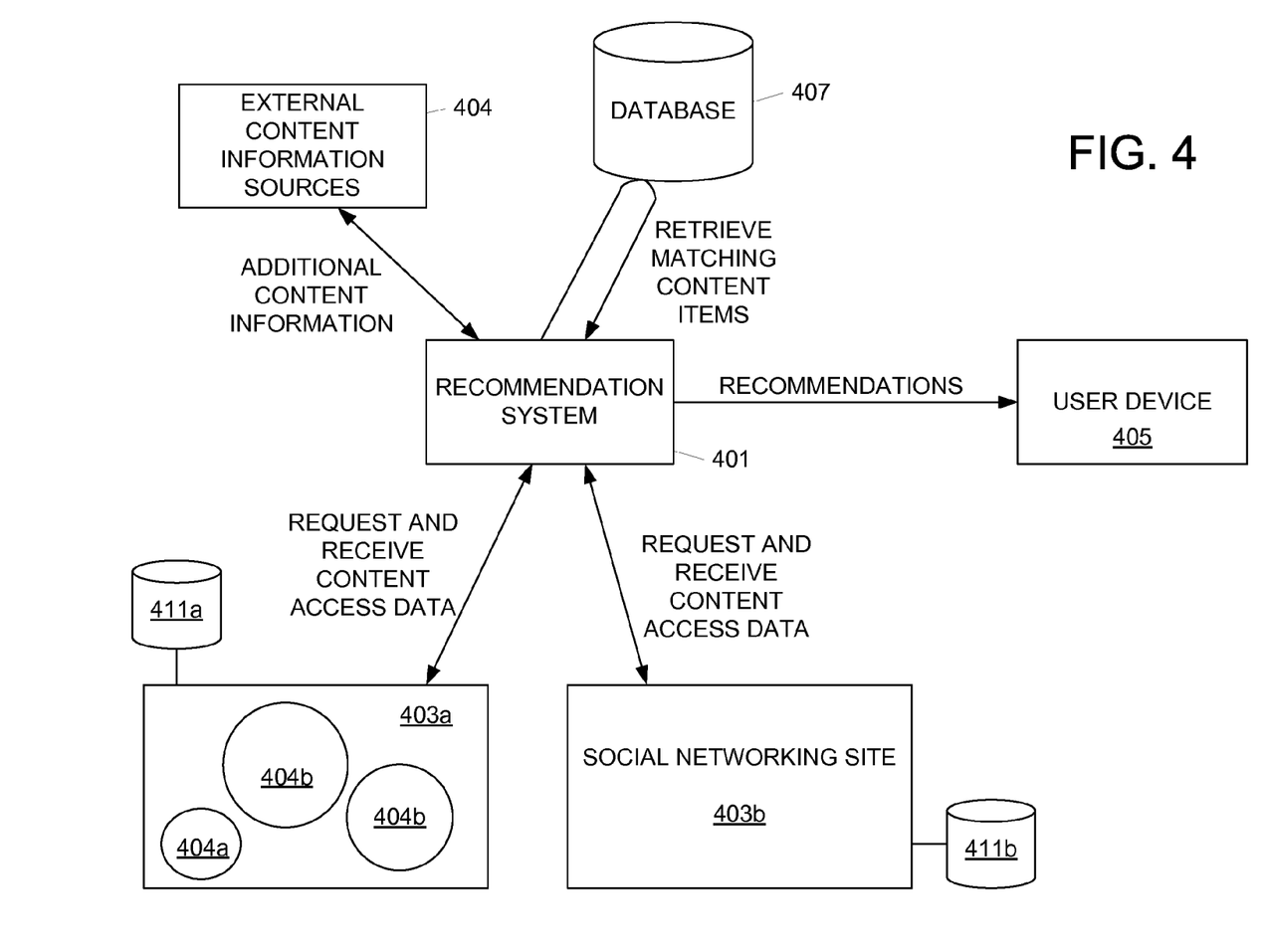
FIG. 4 illustrates an example data flow diagram for generating content item recommendations according to one or more aspects described herein.

FIG. 4 illustrates a data flow of recommendation information and data between a recommendation system 401 (e.g., system 201 of FIG. 2), a social networking site 403, other external content information sources 404 and a user device 405. As illustrated, recommendation system 401 may obtain potential content recommendations from each of a system database 407 and social networking site or communities 403 for a user. A social networking site or community, e.g., site 403a, may include multiple different social networks or groups 404. Each network or group may have restricted or open membership; i.e., some groups may require authorization for memberships while other groups may allow anyone to join. For example, a user may control who is in his or her friends or interest group by requiring approval to be added to the group.

To obtain content access information for a social network from social networking sites 403, recommendation system 401 may transmit validation/authorization information (e.g., the user's credentials) to one or more of sites 403 depending on whether the user is a member thereof. In response, one or more of social networking sites 403 may send back the requested data including information identifying content accessed by other members of the social networks of which the user is also a member. Social networking sites 403 may each include a database 411 that is configured to track and store content access information of its users. Such information may then be made available to recommendation systems such as system 401 through, in one example, an application protocol interface so long as proper authorization information is provided (e.g., login and password of a member user). In one or more configurations, only content access information for members of the user's social networks might be made accessible to the recommendation system.

Recommendation system 401 may further use information from external content information sources 404 to enhance or otherwise modify the recommendation list (e.g., taking into account reviews or categorizations of content items). Once the content data has been processed and the list of content recommendations generated, the list may be transmitted to user device 405. In one or more configurations, the recommendation system 401 may be associated with a filtering/sorting module (e.g., sorting module 215 of FIG. 2) configured to pare down or sort the recommendation list according to various parameters and specifications. In one embodiment, the recommendation system 401 may be configured to provide video content recommendations to a user via user device 405. User device 405 may, for example, include a set-top box (not shown) configured to receive programming information, recommendations and content from recommendation system 401 and/or other content servers (not shown).

Because the list of potential content recommendations may includes tens, hundreds or thousands of results, the list may be filtered or ordered so that the most relevant content items are presented to the user first. For example, if a list of recommendations includes 250 results, the list may be filtered down to the 10, 25, 50 or 100 most relevant to be presented to the user. If the user wishes, he or she may view the next 10, 25, 50 or 100 most relevant and so on. Filtering and ordering may also be used regardless of list size. Filtering and sorting may be performed by taking into account a variety of parameters and criteria including the level of user preference matching, a social circle weight and a system recommendation weight. The level of user preference matching generally refers to how well a content item matches the user preferences, demographics or geographic information.

For example, the level of match may be based on a number of keywords matched in the content description, metadata, title and the like. Social circle weight generally refers to a recommendation modifier determined based on activity in a user's social network involving the content item. As noted, such activity may include tagging, commenting on, sending, and/or rating the content item. System recommendation weight refers generally to a recommendation modifier that takes into account attributes and activity surrounding a content item external to social network activity and user preferences. For example, system recommendation weight may take into account reviews of the content by a newspaper, a system designation of whether the content is featured or normal, tagging, rating or commenting of the content by others outside the user's social network and the like. Based on these weights and considerations, an overall weight or rank for each content item in a list of potential recommendations may be ordered or filtered. Tagging, comments, ratings and other interactions with a content item may be determined, in one or more examples, by examining metadata associated with a content item.

Figure 5:
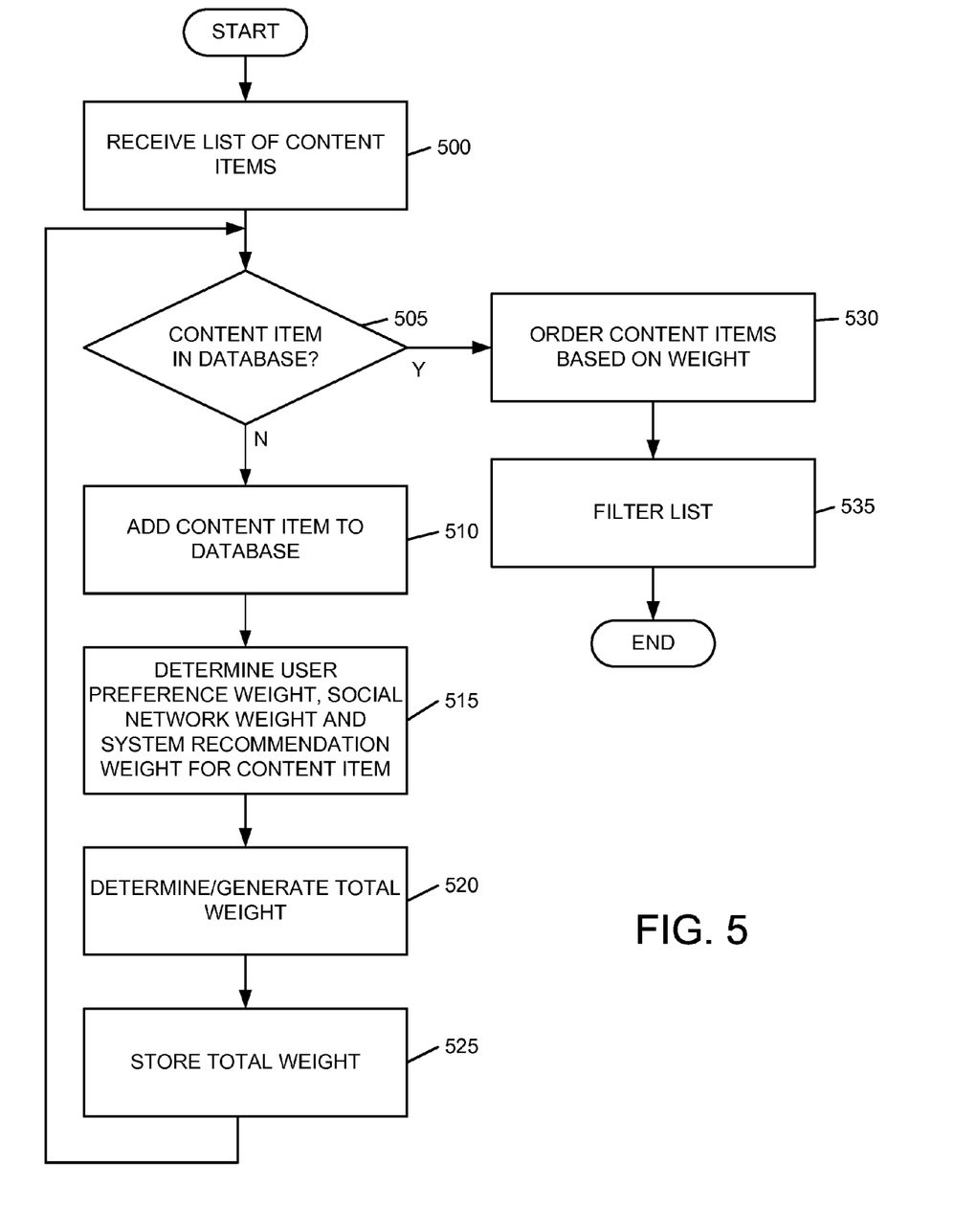
FIG. 5 illustrates an example method for sorting and filtering a list of recommended content items according to one or more aspects described herein.

FIG. 5 illustrates a method for sorting and filtering a list of content items according to one or more aspects described herein. In step 500, an aggregation module may determine or receive a list of content items. The list of content items may be, for example, a list of potential recommendations generated as described in FIG. 3. In step 505, the module may determine whether the list includes a content item that is not included in a recommendations database. If so, the content item may be added to the database so that the content item may be tracked by the recommendation system in step 510. Additionally, the module may determine a social network weight, a user preference weight and a system recommendation weight for the content item in step 515. In one example, a user preference weight may be calculated by determining a number of preferences matched and adding together each of the preferences' respective interest weight. Thus, if a video is about Obama and Iraq and a user is interested in Obama with an interest level of 10 and Iraq with an interest level of 2, the user preference weight may equal 12 (i.e., 10+2). Social network weight, on the other hand, may be calculated based on a number of votes received from members of a social network, an average rating, number of positive or negative comments and the like. System recommendation weight is computed by calculating a correlation coefficient of the video to videos the user has rated highly as well as a correlation coefficient computed against videos rated highly by the larger population of all the users using the recommendation system. In one example, a total user preference weight may be calculated using the formula:

$$\text{Total User Preference Weight} = \Sigma(\text{keyword} * \text{keyword-weight}),$$

where keyword corresponds to a number of occurrences of the keyword in a content item and keyword-weight corresponds to an associated weight of that keyword (e.g., user assigned). Accordingly, the total user preference weight may correspond to a summation of keywords occurring in a content item multiplied by its keyword-weight. Social circle weight may be calculated using the following example formula:

$$\text{Social Circle Weight} = \Sigma(\text{normalized-friend-weight} * \text{interaction-weight})$$

where the normalized-friend-weight corresponds to a weight associated with a friend and normalized across different social networks and social network sites while an interaction-weight corresponds to the weight of a particular interactions. For example, the act of rating a content item with 1 star may have a weight of 1 and that of 5 stars may be 5. In another example, a comment on the video may have a weight of 3. Each interaction made by individuals in the social circle weight may be summed to determine a total social circle weight.

System recommendation weight may be calculated by determining a correlation coefficient between a content item and a user's favorite content items and adding the coefficient to a second correlation coefficient between the content item and all content items rated highly by other users. In one arrangement, the correlation coefficients may comprise Pearson product-moment correlation coefficients calculated based on similarity of content item type, subject matter, actors, length and/or other attributes or combination of attributes. Further description of Pearson product-moment correlation coefficients may be found at http://en.wikipedia.org/wiki/Pearson_product-moment_correlation_coefficient.

In step 520, a total content item weight may be generated based on the social network weight, the user preference weight and the system recommendation weight. For example, the total content item weight may be calculated by summing the social network weight, user preference weight and system recommendation weight. Alternatively or additionally, one or more of the component weights may be modified by a level of importance. For instance, if user preference is considered to be a more significant recommendation criterion, the user preference weight may be multiplied by a factor of 1.5. In another example, the multiplicative product of the component weights may equal the total content item weight. Various other algorithms or formulas may be used to generate a total content item weight based on one or more of the component weights. The total content item weight may be recorded in step 525.

Once the total content item weight has been generated and recorded, the process may revert back to step 505 where the module may determine whether the list includes any content items for which a total content item weight has not been determined. If so, steps 510 through 525 are repeated. If a total content item weight has been generated for all content items in the list, however, the process may proceed to step 530 where the items in the list are ordered according to the determined total content item weight. For example, if a larger total content item weight corresponds to a stronger relevance or recommendation, the list may be sorted from largest to smallest total content item weight to provide a list presenting the recommended content items from most relevant or recommended to least relevant or recommended. In one or more arrangements, if a threshold has been set for a number of recommendations to return or a minimum content item weight, the list may be filtered based on the threshold in step 535. In particular, if the user or a default specifies that only 20 results are to be returned, only the top 20 results may be presented to the user as a recommendations list. If a minimum content item weight has been specified, on the other hand, those items that do not meet the minimum weight might not be presented to the user. The user may, however, be given the option to view those results that were filtered out by one or more filters.

For some categories of content, relevance and importance may be directly tied to a recency of the content. For example, news article about an event may be considered most relevant or important the minute immediately after the occurrence of the event. As time passes, however, the news article (and the event) may become less relevant or important as the news' significance or impact may have lessened. Accordingly, a list of recommended content items may adjust its content item ranking based on a recency factor to account for such temporal bias. According to one or more embodiments, a content item's total weight may be adjusted by a recency modifier.

Figure 6:
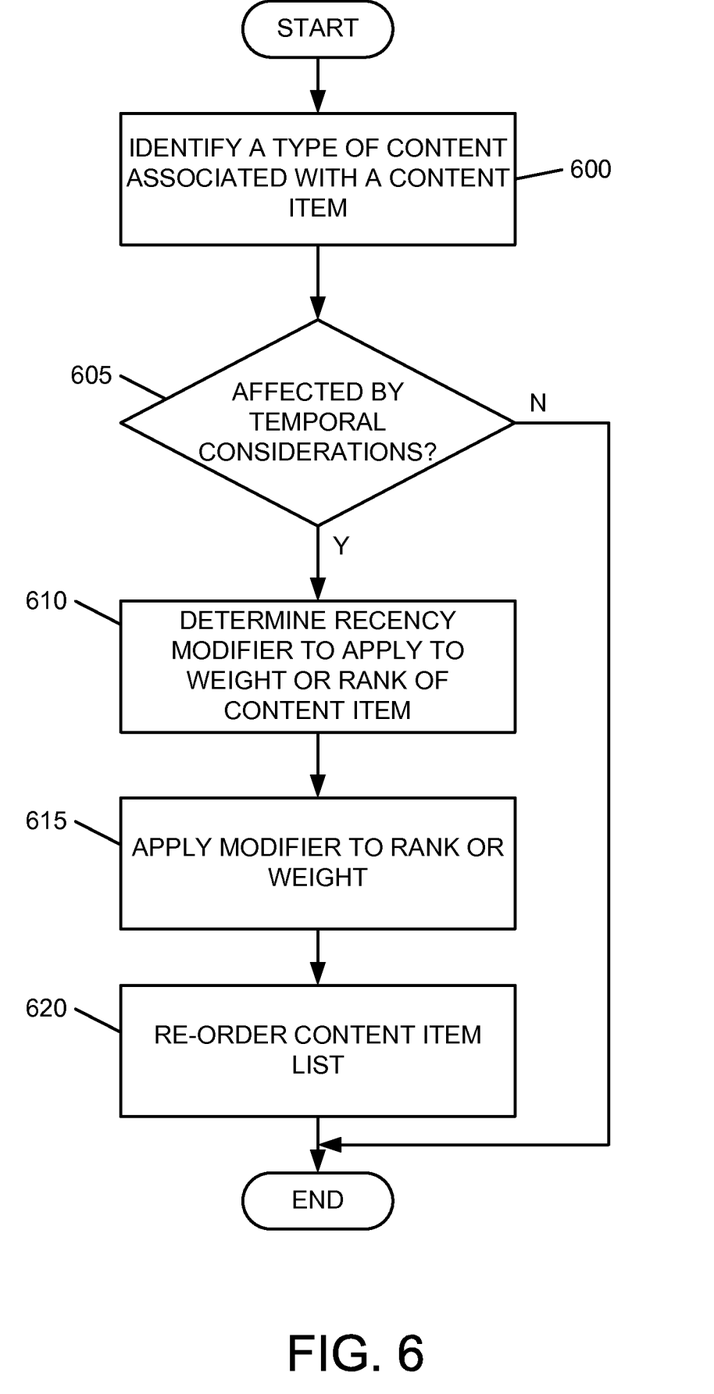
FIG. 6 illustrates an example method for modifying content item weights and/or ranks according to one or more aspects described herein.

FIG. 6 illustrates a method for modifying a content item weight to compensate for a recency factor. In step 600, for example, a weighting module (e.g., part of aggregation module 213 or recommendation system 201 of FIG. 2) may identify a type of content associated with a content item. The type of the content may correspond to various categories such as television shows, news content, commercials, time dependent content, time independent content and the like. In step 605, the weighting module may determine whether the type of content is subject to recency or temporal dependency. For example, news content may be considered to have strong temporal dependency while a commercial or a television show might not. In such instances, news content items may be identified by the weighting module in step 605. Alternatively, all types of content may be subject to recency or temporal dependency and thus, the determination of step 605 might not be needed.

In step 610, the weighting module may determine a recency modifier to apply to the weight or rank of the content item. In one example, the recency modifier may be determined from a modifier table that associates modifier values with a recency value. Alternatively or additionally, a recency modifier may be generated through a formula or algorithm. For instance, if a news report is less than 1 day old, the recency modifier may be 1.0 while 2-day old news reports may correspond to a recency modifier of 0.95. If the news report is 2 weeks old, however, the associated recency modifier may be 0.70. According to one aspect, a decay rate may be specified in addition or as an alternative to a recency modifier schedule. Decay rate, as used herein, refers generally to the speed or pace at which a content item's weight or rank is reduced as a function of time or age. In one or more configurations, and as described in further detail herein, a recency modifier schedule or decay rate may be specific to a content item, type of content item, a user, a content source and/or combinations thereof. In step 615, the recency modifier may be applied to the content item weight by taking the multiplicative product of the content item weight and the recency modifier. Thus, a final weight for a content item may be calculated by the formula:

Final weight=recency modifier*content-item-weight

Alternatively, the final weight may be calculated using the decay rate using the formula:

Final weight=total-content-item-weight*$e^{kt}$, where e corresponds to the mathematical constant e, k corresponds to the decay rate and t corresponds to the age of the content item. Once the final weight for each content item has been calculated, a list of content items may be re-ordered taking into account the modified content item weight in step 620.

According to one aspect, while the decay factor or recency modifier may reduce a final weight of a video or other content item, the total weight may increase based on user interaction on the video. For example, the more interaction a user or social network users have with a video, the higher the social circle weight, system recommendation weight and total weight will be. Accordingly, the speed with which a video decays out of a user's recommended list might not be solely controlled by decay rate, but may also be affected by user interactions.

Figure 7:
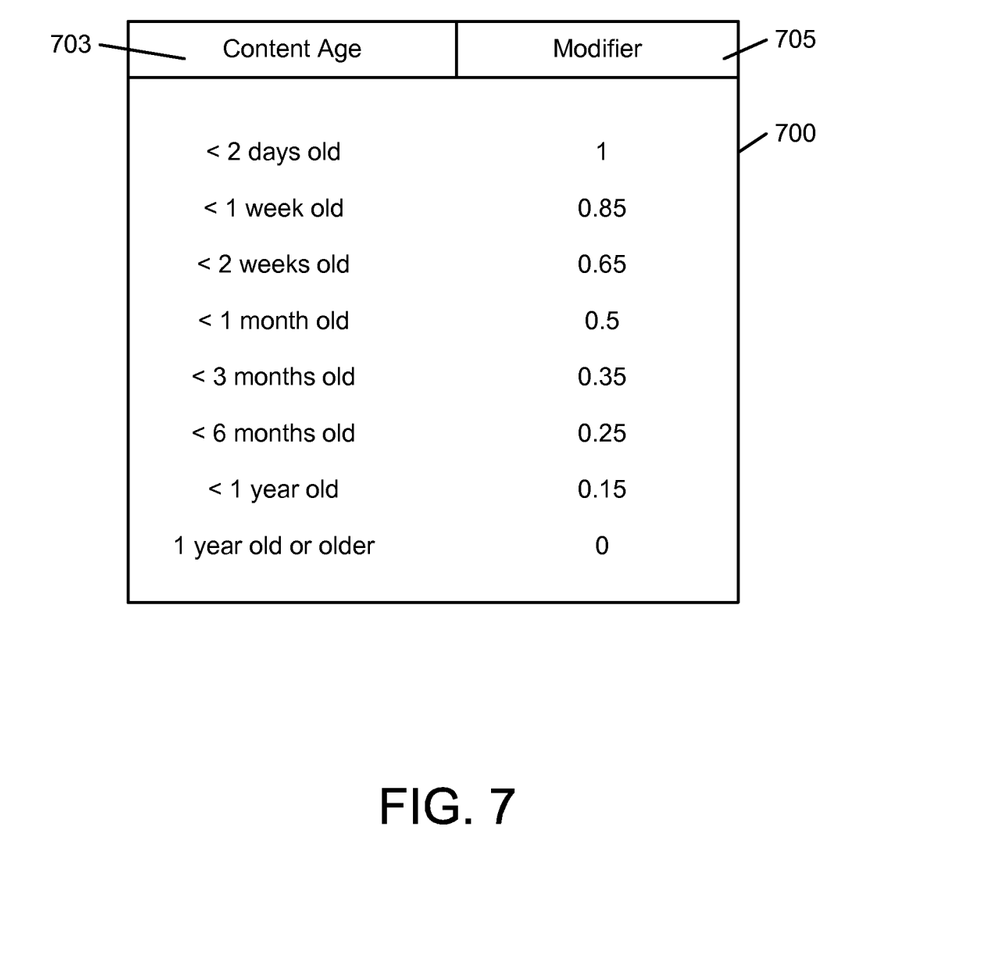
FIG. 7 illustrates an example modifier schedule according to one or more aspects described herein.

FIG. 7 illustrates a recency modifier schedule associating multiple age ranges of content items to corresponding recency modifiers. In particular, schedule 700 specifies ranges 703 of less than 2 days old, less than 1 week old, less than 2 weeks old, less than 1 month old, less than 3 months old, less than 6 months old, less than 1 year old and 1 year or older. For each range, a recency modifier 705 is assigned. Accordingly, if a content item falls into one of the ranges, e.g., less than 2 weeks old, the total content weight of the content item may be adjusted by the corresponding recency modifier, e.g., 0.65. As illustrated, any content item that is 1 year old or older may be given no weight at all by using a recency modifier of 0. Additionally, weights of any content item that is less than 2 days old might not be adjusted, signifying that content items less than 2 days old are still considered fully relevant. The modifier schedule may be stored as a lookup table so that a weight modifier module may retrieve a corresponding modifier value based on the age of a content item.

In some embodiments, the decay rate or weight modifier may be expressed in terms of a half-life. That is, the weight modifier may be expressed as an amount of time that is required for the weight of a content item to decay or decrease by 50%. Alternatively or additionally, the weight modifier or decay rate may be specified as a linear or non-linear formula that converts a content item age to a modifier value. According to another aspect, decay rates or weight modifiers may be personalized. Stated differently, the speed at which a content item or type of content item loses weight or rank or the amount of weight that is lost may depend on a user's preference. For example, a user may consider all news items less than 1 week old to be equally relevant and important while another user may consider all news items older than 3 days old less relevant or important than news items less than 3 days old. In another example, the weight of content items may decrease more slowly over a period of a month for a first user than for a second user. Decay rates or weight modifiers may be learned automatically or autonomously by the system based on user's actions, actions of individuals in the user's social network or external to the user's social network and the like. In one example, a recommendation system may determine a decay rate based on how often a content item is accessed over a period of time, a rate of access (e.g., number of accesses per hour, per day, per minute, etc.), a rate at which accesses of the content item declines and the like.

Figure 8:
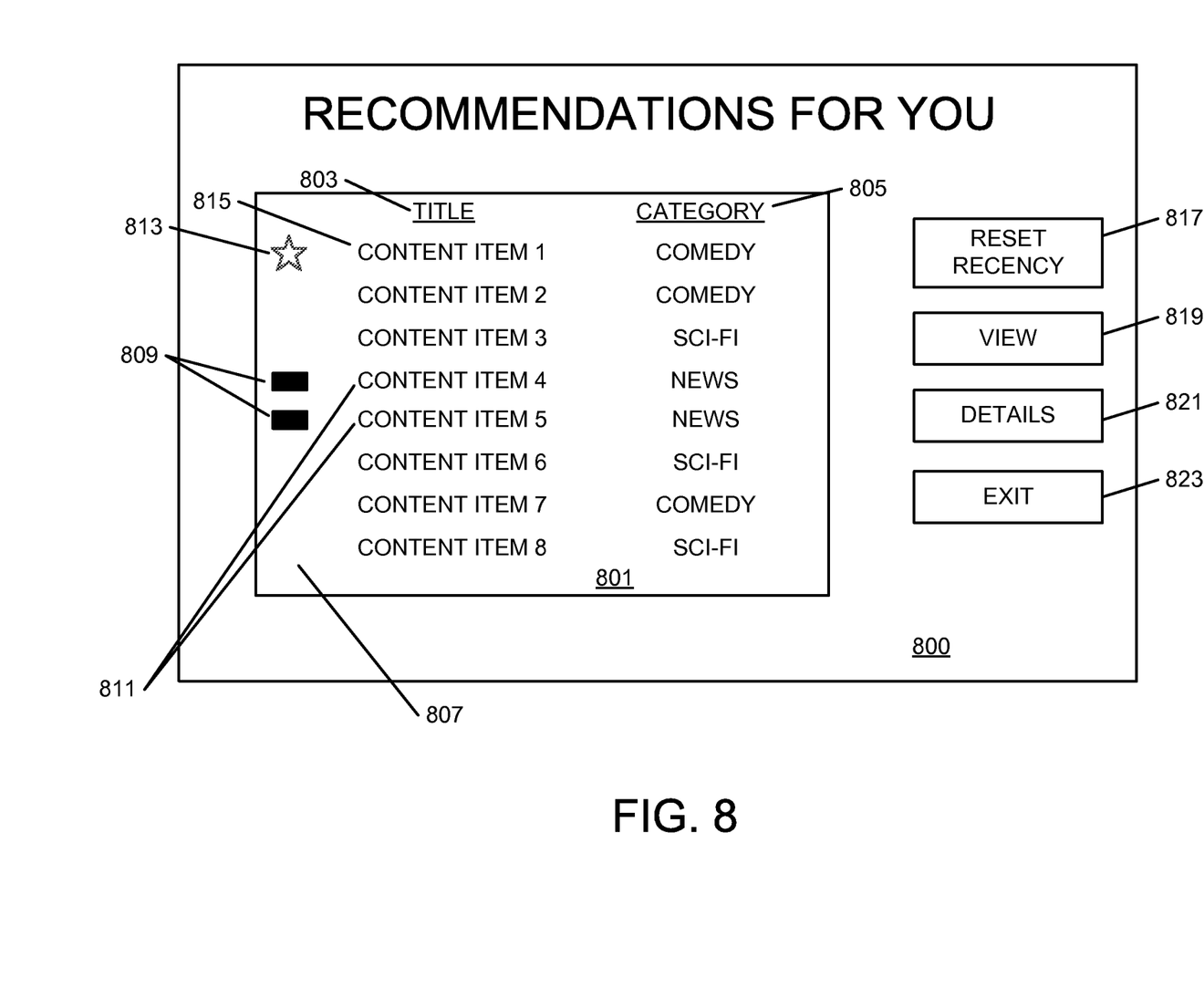
FIG. 8 illustrates an example interface for displaying and interacting with a recommendations list according to one or more aspects described herein.

Alternatively or additionally, content items whose weights have been modified may be displayed in different colors or with a particular indicator to specify that the content item has been modified based on recency or non-recency. FIG. 8 illustrates an interface 800 providing a list of recommended content items. The list 801 of content items may include a title or name 803 of the item and a category 805 to which the content item is associated. List 801 may further include an indicator column 807 that may display various indicators that specify attributes of the corresponding item. In one example, indicator 809 may specify the weights of items 811 were modified for recency (or lack thereof). In another example, indicator 813 may specify that item 815 is a particularly popular item (e.g., as measured by number of individuals in the user's social networks that accessed the item). Interface 800 may further include a reset option 817 that allows a user to reset an item's recency timer. That is, a user may select one or more of items 811 and subsequently reset the age of the item (i.e., age becomes 0 days old) by selecting option 817. In one or more configurations, a user may enter a specific age to which the item should be reset. Interface 800 may further include a view option 819, a details option 821 for viewing a more detailed description of a content item and an exit option 823. View option 819 may be used to access the content item (e.g., to start playback or tune to a corresponding channel).

The recommendation methods, systems and apparatuses described herein may be used in a media distribution network such as a cable or satellite television system. For example, a user's set-top box may be configured to send user preferences and user interaction information to a headend (e.g., headend 102 of FIG. 1). Subsequently, the service provider may generate recommendations based on the user preferences, user interactions, interactions of others within social networks, interactions of individuals on a global scale or any combination or subcombination thereof to generate a list of recommended content items. Additionally, the list of recommended content items may be sorted or ranked using similar information. A cable or satellite television system may further offer content related options such as chat rooms, additional content information screens, interactive games or functions associated with the content and the like.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of IC. Further, the IC may output image data to a display buffer.

Although specific examples have been described, those skilled in the art will appreciate that there are numerous variations and permutations of the above-described systems and methods that are contained within the spirit and scope of the disclosure as set forth in the appended claims. Additionally, numerous other embodiments, modifications and variations within the scope and spirit of the appended claims will occur to persons of ordinary skill in the art from a review of this disclosure.

I claim:

1. A computer-implemented method for making content recommendations comprising:
   receiving, by a network device operating in a content recommendation system, content preference information for a first user;
   identifying, by the network device, a social network of which the first user is a member, wherein the social network is provided by a social networking system different from the content recommendation system;
   determining, by the network device, a first content item accessed by a second user, the second user being a member of the social network;
   determining, by the network device, a social network interest weight and a system recommendation weight for the first content item, wherein the social network interest weight is determined based on one or more content item interactions made by the second user within the social networking system, and wherein the system recommendation weight is determined based on a combination of a first degree of correlation between the first content item and one or more content items liked by the first user within the content recommendation system and a second degree of correlation between the first content item and one or more content items having a threshold recommendation rating within the content recommendation system; and
   generating, by the network device, a content recommendation list including the determined first content item, wherein the content recommendation list is ordered based on a combination of the social network interest weight and the system recommendation weight of the first content item.

2. The computer-implemented method of claim 1, wherein determining the first content item accessed by the second user includes retrieving content access information for the social network, wherein the social network includes only users approved by the first user.

3. The computer-implemented method of claim 1, wherein the content preference information includes a keyword and wherein the method further comprises determining a second content item from a content database based on the keyword.

4. The computer-implemented method of claim 3, further comprising ranking the first content item and the second content item based on the social network interest weight, wherein the social network interest weight is determined by:

determining a user weight of the second user that represents an importance of at least one of the second user and a relationship with the second user within the social networking system; and determining a normalized user weight for the second user and an interaction weight of an interaction made by the second user, wherein the normalized user weight is generated by normalizing the user weight across multiple different social networks.

5. The computer-implemented method of claim 4, wherein ranking the first and second content items is further based on an occurrence of the keyword in the first content item.

6. The computer-implemented method of claim 1, wherein the content preference information includes a first interest, a second interest, a first level of interest associated with the first interest and a second level of interest associated with the second interest.

7. The computer-implemented method of claim 1, wherein receiving the content preference information for the first user includes determining the content preference information based on attributes of one or more content items accessed by the first user.

8. The computer-implemented method of claim 1, wherein the content recommendation list includes the first content item at a first position and wherein the method further comprises moving the first content item from the first position to a second position in the list upon expiration of a specified amount of time, wherein the second position is indicative of a lower relevance than the first position.

9. The computer-implemented method of claim 1, further comprising assigning a weight to the first content item based on interactions of the second user with the first content item.

10. The computer-implemented method of claim 9, further comprising decreasing the weight of the first content item based on an age of the first content item.

11. The method of claim 1, wherein the one or more content item interactions include voting for the content items on a social network site of the social network system.

12. The method of claim 1, wherein the one or more content item interactions includes entry of user comments about the content items on a social network site of the social network system.

13. An apparatus comprising:

a processor; and memory operatively coupled to the processor and storing computer readable instructions that, when executed, cause the apparatus to:

identify a social network of which a first user is a member, wherein the social network is provided by a social networking system different from a content recommendation system in which the apparatus operates;

determine a first content item accessed by a second user, the second user being a member of the social network; and order the first content item within a content recommendation list based on a combination of a social network interest weight and a system recommendation weight, wherein the social network interest weight is determined based on one or more content item interactions made by the second user within the social networking system, and wherein the system recommendation weight is determined based on a first degree of correlation between the first content item and one or more content items previously watched or rated by the first user within the content recommendation system and a second degree of correlation between the first content item and one or more content items having a threshold recommendation rating within the content recommendation system.

14. The apparatus of claim 13, wherein the computer readable instructions, when executed, further cause the apparatus to transmit the content recommendation list to a remote set-top box.

15. The apparatus of claim 14, further comprising a headend device connected to the remote set-top box through a distribution network.

16. The apparatus of claim 13, the computer readable instructions, when executed, further cause the apparatus to assign a weight to the first content item and wherein the weight is determined based on one or more interactions of the second user with the first content item.

17. The apparatus of claim 16, wherein the weight is further determined based on content information received from a non-social network external source.

18. The apparatus of claim 17, wherein the non-social network external source is a website.

19. The apparatus of claim 13, wherein the social network only includes individuals approved by the first user.

20. The apparatus of claim 13, wherein the computer readable instructions, when executed, further cause the apparatus to:

receive content preference information of the first user, wherein the content preference information includes a keyword; and determine a second content item from a content database based on the keyword.

21. The apparatus of claim 20, wherein the computer readable instructions, when executed, further cause the apparatus to rank the first content item and the second content item based on the social network interest weight, wherein the social network interest weight is determined by:

determining a user weight of the second user that represents an importance of at least one of the second user and a relationship with the second user within the social networking system;

determining a normalized user weight for the second user and an interaction weight of an interaction made by the second user, wherein the normalized user weight is generated by normalizing the user weight for the second user across multiple different social networks; and combining the normalized user weight with the interaction weight for the interaction made by the second user.

22. The apparatus of claim 13, wherein the computer readable instructions, when executed, further cause the apparatus to provide a chat functionality relating to the first content item to the first user and the second user.

23. One or more non-transitory computer readable media storing computer readable instructions that, when executed, cause an apparatus to:

identify a social network of which a first user is a member, wherein the social network is provided by a social networking system different from a content recommendation system in which the apparatus operates;

determine a first content item accessed by a second user based on information from the social networking system;

determine a social network interest weight and a system recommendation weight for the first content item, wherein the social network interest weight is determined based on one or more content item interactions made by the second user within the social networking system, and wherein the system recommendation weight is determined based on a first degree of correlation between the first content item and one or more content items with which the first user has previously interacted within the content recommendation system and a second degree of correlation between the first content item and one or more content items having a threshold recommendation rating within the content recommendation system; and generate a content recommendation list including the determined first content item, wherein the content recommendation list is ordered based on a combination of the social network interest weight and the system recommendation weight.

24. The one or more computer readable media of claim 23, wherein the computer readable instructions, when executed, further cause the apparatus to receive content preference information of the first user, wherein the content preference information includes a first interest, a second interest, a first level of interest associated with the first interest and a second level of interest associated with the second interest.

25. The one or more computer readable media of claim 23, wherein the computer readable instructions, when executed, further cause the apparatus to determine content preference information based on attributes of one or more content items accessed by the first user.

26. The one or more computer readable media of claim 23, wherein the content recommendation list includes the first content item at a first position and wherein the computer readable instructions, when executed, further cause the apparatus to move the first content item from the first position to a second position in the list upon the first content item reaching a specified age, wherein the second position is indicative of a lower relevance than the first position.

27. The one or more computer readable media of claim 23, wherein the computer readable instructions, when executed, further cause the apparatus to assign a weight to the first content item based on interactions of the second user with the first content item.

28. The one or more computer readable media of claim 27, wherein the computer readable instructions, when executed, further cause the apparatus to decrease the weight of the first content item based on an age of the first content item.

* * * * *